United States Patent [19]
Sandstrom et al.

[11] Patent Number: 5,844,044
[45] Date of Patent: Dec. 1, 1998

[54] TRANS 1,4-BUTADIENE/ISOPRENE COPOLYMERS AND TIRE WITH TREAD THEREOF

[75] Inventors: Paul Harry Sandstrom, Tallmadge; Wen-Liang Hsu, Akron, both of Ohio

[73] Assignee: The Goodyear Tire & Rubber Company, Akron, Ohio

[21] Appl. No.: 897,108

[22] Filed: Jul. 18, 1997

[51] Int. Cl.⁶ .......................................... C08L 9/00
[52] U.S. Cl. ................ 525/237; 525/232; 525/342; 524/492; 524/495; 524/573; 152/209 R
[58] Field of Search ..................... 525/237, 232, 525/342, 332.8; 524/492, 495, 573; 152/209 R

[56] References Cited

U.S. PATENT DOCUMENTS

| | | | |
|---|---|---|---|
| 3,502,707 | 3/1970 | Fischer et al. | 525/237 |
| 4,670,502 | 6/1987 | Hargis et al. | 525/237 X |
| 5,025,059 | 6/1991 | Mouri et al. | 525/237 X |
| 5,386,865 | 2/1995 | Sandstrom et al. | 525/237 X |
| 5,580,930 | 12/1996 | Kang et al. | 525/237 |

*Primary Examiner*—Fred Teskin
*Attorney, Agent, or Firm*—Henry C Young, Jr.

[57] ABSTRACT

Trans 1,4-copolymers of butadiene and isoprene are provided as blends with other elastomers, including partial replacement of natural cis 1,4-polyisoprene in elastomer compositions. Pneumatic rubber tires with components composed of such elastomer blends, including tire treads, are also included.

15 Claims, No Drawings

TRANS 1,4-BUTADIENE/ISOPRENE COPOLYMERS AND TIRE WITH TREAD THEREOF

FIELD

This invention relates to trans 1,4-copolymers of butadiene and isoprene as blends with other elastomers, including partial replacement of natural cis 1,4-polyisoprene in elastomer compositions. Pneumatic rubber tires with components of such elastomer blends, including tire treads, are also included.

BACKGROUND

Pneumatic rubber tires conventionally have elastomer based components, including treads, which are subject, under operating conditions, to considerable dynamic distortion and flexing, abrasion due to scuffing, fatigue cracking and weathering such as, for example, atmospheric aging.

Typically, cis 1,4-polybutadiene rubber is included in a tread rubber composition for a purpose of reducing wear and thus increasing tread life. The cis 1,4-polybutadiene rubber may also be included in sidewall rubber compositions to retard abrasion due to scuffing and, also to retard cracking.

Further, where a tire may be utilized, for example, in an off-the-road service, such as in mine operations and in logging operations, where the tire is run over rough terrain, growth of a crack, or cut, in the tire component such as a tread or sidewall is a consideration. Often a combination of cis 1,4-polybutadiene rubber and natural cis 1,4-polyisoprene rubber is used in the tread or sidewall rubber to retard cut growth.

Use of trans 1,4-polybutadiene rubber in a tire tread and in a tire sidewall rubber composition has been suggested. Partial replacement of natural cis 1,4-polyisoprene with trans 1,4-polybutadiene rubber for tire sidewalls has also been suggested.

Suggestion of use of trans 1,4-polybutadiene tire treads has been suggested, for example, in Japanese Patent Publication Nos. 60-113,036; 62-101,504 and 61-143,453 and U.S. Pat. Nos. 4,510,291 and 5,025,059).

Copolymers of isoprene and butadiene have been suggested for tire components such as tread rubber composition blends. Such copolymers are primarily cis 1,4-microstructured copolymers of isoprene and butadiene. For example, see U.S. Pat. No. 5,405,927.

Use of a trans 1,4-copolymer of isoprene and butadiene, however, and not a physical blend of trans 1,4-polyisoprene and of trans 1,4-polybutadiene, appears to be novel for rubber compositions and use of such compositions for tire components including tire treads.

In the description of this invention, the terms "compounded" rubber compositions and "compounds"; where used refer to the respective rubber compositions which have been compounded with appropriate compounding ingredients such as, for example, carbon black, oil, stearic acid, zinc oxide, silica, wax, antidegradants, resin(s), sulfur and accelerator(s) and silica and silica coupler where appropriate. The terms "rubber" and "elastomer" may be used interchangeably. The amounts of materials are usually expressed in parts of material per 100 parts of elastomer by weight (phr).

DISCLOSURE AND PRACTICE OF THE INVENTION

In accordance with this invention, a rubber composition is provided which is comprised of, based upon 100 parts by weight rubber (phr), (A) about 2 to about 20 phr of a trans 1,4-copolymer of isoprene and butadiene containing about 20 to about 80 percent units derived from isoprene and having a Tg within a range of about −70° C. to about −80° C.; and, correspondingly, (B) about 80 to about 98 phr of at least one other elastomer selected from diene-based elastomers selected from homopolymers and copolymers of isoprene and 1,3-butadiene and copolymers of isoprene and/or 1,3 butadiene with a vinyl aromatic hydrocarbon such as styrene and alpha-methylstyrene.

In further accordance with this invention, such a rubber composition is provided which contains about 20 to about 120 phr of filler selected from rubber reinforcing carbon black and, optionally, precipitated silica; wherein said carbon black is present in an amount of about 5 to about 80 phr, preferably about 30 to about 60 phr. If silica is used, the silica may be present in an amount of about 5 to about 80, alternatively about 15 to about 55, phr so long as the total of said carbon black and silica fillers is within the aforesaid range of about 20 to about 120, preferably about 35 to about 85 phr.

The silica is conventionally used in conjunction with a silica coupler to couple the silica to the elastomer(s), thus, enhancing its effect as reinforcement for the elastomer composition. Use of silica couplers for such purpose are well known and typically have a moiety reactive with the silica and another moiety interactive with the elastomer(s) to create the silica-to-rubber coupling effect.

In further accordance with this invention, a pneumatic rubber tire is provided having at least one component as the said rubber composition.

In additional accordance with this invention, said pneumatic tire component is a tire tread.

Preferably, such trans 1,4-copolymer is characterized by having about 75 to about 98 percent of its repeat units of a trans 1,4-isomeric structure, about 2 to about 18 percent of its units of a cis 1,4-isomeric structure and about 2 to about 18 percent of its units of a vinyl 1,2-structure.

The trans 1,4-copolymers utilized by this invention might be prepared, for example, by anionic polymerization by batch or continuous polymerization of 1,3-butadiene in an organic solvent and in the presence of cobalt octoate and triethyl aluminum as a catalyst system with a para alkyl substituted phenol as a catalyst modifier or a triisobutyl aluminum/vanadium tetrachloride/titanium tetrachloride catalyst.

The hereinbefore referenced silica coupler might be, for example, a bis(trialkoxysilylalkyl) polysulfide which contains from two to about 8 sulfur atoms, usually an average of from about 2.3 to about 4, sulfur atoms in its polysulfidic bridge. The alkyl groups may be selected, for example, from methyl, ethyl and propyl radicals. Exemplary of such coupler might be, for example, bis-(triethoxysilylpropyl) polysulfide.

In the practice of this invention, the rubber compositions may be comprised of (A) the trans 1,4-copolymer with (B) at least one rubber selected, for example, from cis 1,4-polyisoprene rubber, natural or synthetic, 3,4-polyisoprene rubber, styrene/butadiene copolymer rubber, isoprene/butadiene copolymer rubber, styrene/isoprene/butadiene terpolymer rubber, and cis 1,4-polybutadiene rubber.

It is readily understood by those having skill in the art that the rubber compositions would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur-vulcanized material (rubbers), the additives mentioned above are selected and commonly used in conventional amounts.

Typical additions of reinforcing carbon black have been hereinbefore discussed. Typical amounts of tackifier resins, if used, may comprise about 0.5 to about 10 phr, usually about 1 to about 5 phr. Typical amounts of processing aids may comprise 1 to 20 phr. Such processing aids can include, for example, aromatic, napthenic, and/or paraffinic processing oils. Silica, if used, has been hereinbefore discussed. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to about 5 phr. Typical amounts of fatty acids, if used, which can include stearic acid comprise about 0.5 to about 3 phr. Typical amounts of zinc oxide comprise about 2 to about 6 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide. The presence and relative amounts of the above additives are considered to be not an aspect of the present invention which is more primarily directed to the utilization of specified blends of rubbers in tire sidewalls as sulfur vulcanizable compositions.

The vulcanization is conducted in the presence of a sulfur-vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur-vulcanizing agent is elemental sulfur. As known to those skilled in the art, sulfur-vulcanizing agents are used in an amount ranging from about 0.5 to about 4 phr, with a range of from about 0.5 to about 2.25 being preferred.

Accelerators are used to control the time and/or temperature required for vulcanization and to improve the properties of the vulcanizate. In one embodiment, a single accelerator system may be used, i.e., primary accelerator. Conventionally, a primary accelerator is used in amounts ranging from about 0.5 to about 2.0 phr. In another embodiment, combinations of two or more accelerators which the primary accelerator is generally used in the larger amount (0.5 to 2 phr), and a secondary accelerator which is generally used in smaller amounts (0.05–0.50 phr) in order to activate and to improve the properties of the vulcanizate. Combinations of these accelerators have been known to produce a synergistic effect on the final properties and are somewhat better than those produced by use of either accelerator alone. In addition, delayed action accelerators may be used which are not affected by normal processing temperatures but produce satisfactory cures at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent and accelerator(s) are not considered to be an aspect of this invention which is more primarily directed to the utilization of specified blends of trans 1,4-copolymers with other elastomers for various rubber compositions which may be, for example, components of tires.

Sometimes, the combination of zinc oxide, fatty acid, sulfur and accelerator(s) may be collectively referred to as curatives.

Sometimes a combination of antioxidants, antiozonants and waxes may be collectively referred to as antidegradants.

The tire can be built, shaped, molded and cured by various methods which will be readily apparent to those having skill in such art.

The prepared tire of this invention is conventionally shaped and cured by methods known to those having skill in such art.

The invention may be better understood by reference to the following example in which the parts and percentages are by weight unless otherwise indicated.

EXAMPLE I

A mixture composed of 20.5 weight percent of a mixture of 1,3-butadiene and isoprene monomers (in a 77/23 ratio) and 79.5 weight percent hexane (in an amount of 625 ml) was passed over silica gel and transferred to a glass bottle and then charged with 8.2 ml of a catalyst dispersion of a product of 25 weight percent triisobutyl aluminum (TIBA) vanadium tri-chloride ($VCl_3$) and titanium tetrachloride ($TICL_4$) in hexane solvent. The representative Molar ratios of the materials are: 0.5 TIBA/1.0 $VCl_3$/0.25 $TiCl_4$ with the overall concentration being 0.2M with respect to vanadium.

The mixture was allowed to react (monomers allowed to polymerize) at room temperature (about 23° C.) for about 24 hours while being continuously agitated with on a mechanical shaker. The polymerization was shortstopped by addition of a very small amount of methanol/butylated hydroxy toluene/hexane mixture.

The solvent was decanted from the mixture and the remaining white granular solid polymer washed with isopropanol. The washed polymer was then treated with a methanol/butylated hydroxy toluene/hexane solution prior to hot air oven drying at about 60° C. A conversion of 67 grams of the monomers (80% yield) to the trans 1,4-copolymer was obtained. The trans 1,4-copolymer of butadiene and isoprene had dual melting point temperatures of 55° C. and 134° C. by differential scanning calorimeter measurement with a temperature rise of 10° C./minute).

Rubber compositions containing the materials recited in Table 1 were prepared in a laboratory BR Banbury using three separate, sequential stages of addition of ingredients, namely, non-productive mixing steps without curatives at about 150° C. (NP1 followed by NP2) and a final, productive mixing step at about 100° C. (P). The rubber mixture was allowed to cool between the mixing steps to below 40° C.

TABLE 1

Mixing Procedure (Parts by Weight)

| | Total | NP1 | NP2 | P |
|---|---|---|---|---|
| Natural Rubber | 63–75 variable | 63–75 variable | | |
| Trans Copolymer[1] | 0–12 variable | 0–12 variable | | |
| Natsyn ® 2200[2] | 25 | 25 | | |
| ISAF Carbon Black | 47 | 30 | 17 | |
| Antidegradents | 4 | 4 | | |
| Wax | 1.5 | 1.5 | | |
| Processing Oil | 5 | 5 | | |
| Stearic Acid | 4 | 4 | | |
| Zinc Oxide | 4 | | | 4 |
| Cure System[3] | 2.75 | | | 2.75 |

[1]Trans 1,4-copolymer of butadiene and isoprene rubber composed of about 23 percent units derived from isoprene, softening (melting) points of 55° C. and 134° C. and Tg of about −75° C. prepared according to Example I.
[2]Synthetic cis 1,4-polyisoprene rubber obtained from The Goodyear Tire & Rubber Company.
[3]Sulfur and accelerator.

The following Table 2 reports the cure behavior and vulcanizate properties for a control rubber composition of natural rubber and synthetic cis 1,4-polyisoprene (Natsyn® 2200 from The Goodyear Tire & Rubber Company) and experimental Compounds B and C which contain 6 and 12 phr of trans copolymer A as replacements for natural rubber. The cured properties (Table 2) show the advantage of the trans copolymer addition (Blends A and C) in producing higher tear strength as compared to the Control blend A as measured by the Instron tear test.

TABLE 2

| Compound | A | B | C |
|---|---|---|---|
| Trans Copolymer (phr) | 0 | 6 | 12 |
| Monsanto Rheometer @ 150° | | | |
| Max Torque | 42.7 | 44.4 | 46.8 |
| Min Torque | 13.9 | 15.4 | 16.1 |
| T$_{90}$, mins | 7.0 | 7.5 | 7.4 |
| Stress-Strain | | | |
| Tensile Strength, MPa | 28.4 | 26.0 | 21.4 |
| Elongation @ Break, % | 625 | 565 | 450 |
| 300% Modulus, MPa | 10.3 | 11.8 | 13.2 |
| Zwick Rebound | | | |
| 23° C. % | 39.0 | 33.5 | 30.5 |
| 100° C., % | 52.5 | 46.5 | 44.5 |
| Instron Tear | | | |
| 23° C. Newtons | 1152 | 1405 | 1407 |

EXAMPLE II

A mixture of 20.5 weight percent 1,3-butadiene and isoprene (in a 75/25 ratio) and 79.5 weight percent hexane (625 ml) was passed over silica gel and transferred to a glass bottle. A catalyst of about 8.2 ml of the product of TIBA, VCl$_3$ and TiCl$_4$ as in Example I was used.

The mixture was reacted at room temperature (about 23° C.) for 24 hours on a mechanical shaker. The polymerization was shortstopped with addition of a very small amount of a methanol/butylated hydroxy toluene/hexane mixture. A solvent of isopropanol was used to wash the recovered copolymer. The washed copolymer was then treated with a butylated hydroxy toluene/hexane solution and then hot air oven dried at 60° C. A conversion of 67 gram of the monomers (80% yield) was obtained after drying the trans 1,4-copolymer (A). The trans 1,4-copolymer had melting temperatures of 53° and 133°.

Trans 1,4-copolymers of butadiene and isoprene (B) (50/50 butadiene/isoprene copolymer) and (C) (25/75 butadiene/isoprene copolymer) were similarly prepared. The yield, glass transition (Tg) and melting temperatures (Tm) of these copolymers are tabulated in the following Table 3. The copolymers exhibited a multiplicity of melting points (Tm's).

TABLE 3

| Trans Copolymer | Butadiene/Isoprene Ratio | Yield (%) | Tg (°C.) | Tm (°C.) |
|---|---|---|---|---|
| A | 75/25 | 80 | −77 | 53, 133 |
| B | 50/50 | 78 | −77 | 20, 54 |
| C | 25/75 | 75 | −78 | −3, 2, 57 |

Rubber compositions containing the materials recited in Table 4 were prepared by blending in an internal laboratory BR Banbury internal rubber mixer.

TABLE 4

Mixing Procedure

| | Total | NP1 | NP2 | P |
|---|---|---|---|---|
| Natural Rubber | 90–100 variable | 90–100 variable | | |
| Trans Copolymer[1] | 0–10 variable | 0–10 variable | | |
| ISAF Carbon Black | 50 | 20 | 30 | |
| Antidegradents | 4 | 4 | | |
| Wax | 1.5 | 1.5 | | |
| Processing Oil | 4 | 4 | | |
| Stearic Acid | 2 | 2 | | |
| Zinc Oxide | 4 | 4 | | |
| Cure System[2] | 4 | | | 4 |

[1]Trans 1,4-copolymer of isoprene and butadiene.
[2]Sulfur, accelerator, retarder.

Table 5 reports the cure behavior and vulcanizate properties for a control as a natural (cis 14-polyisoprene) based rubber composition (Compound D) and experimental compounds E-S which contain 2.5, 5.0 and 10.0 phr, respectively, of trans 1,4-isoprene/butadiene copolymers A, B and C of Table 3. The Instron tear results from Tables 5a, 5b and 5c and plotted in FIG. 1 indicate that the copolymers provide improved values over the control Compound D.

TABLE 5(a)

| Compound | D | E | F | G |
|---|---|---|---|---|
| Natural Rubber | 100 | 97.5 | 95.0 | 90.0 |
| Trans Copolymer A | 0 | 2.5 | 5.0 | 10.0 |
| Trans Copolymer B | 0 | 0 | 0 | 0 |
| Trans Copolymer C | 0 | 0 | 0 | 0 |
| Rheometer, 150° C. | | | | |
| Max Torque | 45.0 | 47.7 | 43.1 | 46.6 |
| Min Torque | 9.0 | 11.5 | 10.1 | 11.5 |
| T$_{90}$, mins | 15.8 | 15.1 | 15.3 | 15.0 |
| Stress-Strain | | | | |
| Tensile Strength, MPa | 25.6 | 18.8 | 28.5 | 21.5 |

TABLE 5(a)-continued

| Compound | D | E | F | G |
|---|---|---|---|---|
| Elongation @ Break, % | 504 | 316 | 494 | 391 |
| 300% Modulus, MPa | 13.6 | 17.9 | 15.0 | 16.0 |
| Zwick Rebound | | | | |
| (23° C.) % | 54.5 | 54.5 | 47.0 | 56.0 |
| 100° C., % | 70.0 | 70.0 | 64.0 | 72.0 |
| Instron Tear | | | | |
| (23° C.) Newtons | 780 | 762 | 820 | 869 |

TABLE 5(b)

| Compound | D | H | I | J |
|---|---|---|---|---|
| Natural Rubber | 100 | 97.5 | 95.0 | 90.0 |
| Trans Copolymer A | 0 | 0 | 0 | 0 |
| Trans Copolymer B | 0 | 2.5 | 5.0 | 10.0 |
| Trans Copolymer C | 0 | 0 | 0 | 0 |
| Rheometer, 150° C. | | | | |
| Max Torque | 45.0 | 46.5 | 47.0 | 46.1 |
| Min Torque | 9.0 | 9.7 | 11.5 | 11.8 |
| $T_{90}$, mins | 15.8 | 15.8 | 15.4 | 15.3 |
| Stress-Strain | | | | |
| Tensile Strength, MPa | 25.6 | 24.8 | 26.5 | 24.5 |
| Elongation @ Break, % | 504 | 451 | 473 | 454 |
| 300% Modulus, MPa | 13.6 | 15.0 | 16.5 | 15.2 |
| Zwick Rebound | | | | |
| (23° C.) % | 54.5 | 53.5 | 48.0 | 54.5 |
| 100° C., % | 70.0 | 69.0 | 64.5 | 70.0 |
| Instron Tear | | | | |
| (23° C.) Newtons | 780 | 775 | 965 | 762 |

TABLE 5(c)

| Compound | D | K | L | M |
|---|---|---|---|---|
| Natural Rubber | 100.0 | 97.5 | 95.0 | 90.0 |
| Trans Copolymer A | 0 | 0 | 0 | 0 |
| Trans Copolymer B | 0 | 0 | 0 | 0 |
| Trans Copolymer C | 0 | 2.5 | 5.0 | 10.0 |
| Rheometer, 150° C. | | | | |
| Max Torque | 45.0 | 46.2 | 46.0 | 46.2 |
| Min Torque | 9.0 | 9.9 | 9.6 | 9.8 |
| $T_{90}$, mins | 15.8 | 16.3 | 16.3 | 16.3 |
| Stress-Strain | | | | |
| Tensile Strength, MPa | 25.6 | 27.9 | 23.2 | 23.9 |
| Elongation @ Break, % | 504 | 509 | 459 | 451 |
| 300% Modulus, MPa | 13.6 | 15.6 | 14.1 | 14.5 |
| Zwick Rebound | | | | |
| (23° C.) % | 54.5 | 52.0 | 54.0 | 52.5 |
| 100° C., % | 70.0 | 67.5 | 70.0 | 69.0 |
| Instron Tear | | | | |
| (23° C.) Newtons | 780 | 889 | 752 | 667 |

While certain representative embodiments and details have been shown for the purpose of illustrating the invention, it will be apparent to those skilled in this art that various changes and modifications may be made therein without departing from the spirit or scope of the invention.

What is claimed is:

1. A rubber composition comprised of, based upon 100 parts by weight rubber (phr), (A) about 2 to about 20 phr of a trans 1,4-copolymer of isoprene and butadiene containing about 20 to about 80 percent units derived from isoprene and having a Tg within a range of about −70° C. to about −80° C.; and, correspondingly, (B) about 80 to about 98 phr of at least one other elastomer selected from homopolymers and copolymers of isoprene and 1,3-butadiene and copolymers of isoprene and/or 1,3-butadiene with a vinyl aromatic hydrocarbon selected from styrene and alpha-methylstyrene.

2. The rubber composition of claim 1 wherein said 1,4-trans copolymer of isoprene and butadiene is characterized by having about 75 to about 98 percent of its repeat units of a trans 1,4-isomeric structure, about 2 to about 18 percent of its repeat units of a cis 1,4-isomeric structure and about 2 to about 18 percent of its repeat units of a vinyl 1,2-structure.

3. The rubber composition of claim 1 which contains about 20 to about 120 phr of rubber reinforcing carbon black and precipitated silica; wherein said carbon black is present in an amount of about 5 to about 80 phr and the silica is present in an amount of about 15 to about 55, phr, together with a coupler for said silica having a moiety reactive with silanol groups on the surface of said silica and another moiety interactive with said elastomer(s).

4. The rubber composition of claim 2 which contains about 20 to about 120 phr of rubber reinforcing carbon black and precipitated silica; wherein said carbon black is present in an amount of about 5 to about 80 phr and the silica is present in an amount of about 15 to about 55 phr, together with a coupler for said silica having a moiety reactive with silanol groups on the surface of said silica and another moiety interactive with said elastomer(s).

5. The rubber composition of claim 3 wherein said silica coupler is a bis(trialkoxysilylalkyl) polysulfide which contains from two to about 8, with an average of about 2.3 to about 4, sulfur atoms in its polysulfidic bridge and where said alkyl groups are selected from methyl, ethyl and propyl radicals.

6. The rubber composition of claim 5 wherein said silica coupler is a bis(trialkoxysilylalkyl) polysulfide which contains from two to about 8, with an average of about 2.3 to about 4, sulfur atoms in its polysulfidic bridge and where said alkyl groups are selected from methyl, ethyl and propyl radicals.

7. The rubber composition of claim 4 wherein said silica coupler is a bis(trialkoxysilylalkyl) polysulfide which contains from two to about 8, with an average of about 2.3 to about 4, sulfur atoms in its polysulfidic bridge and where said alkyl groups are selected from methyl, ethyl and propyl radicals.

8. A tire having a tread of the composition of claim 1.
9. A tire having a tread of the composition of claim 2.
10. A tire having a tread of the composition of claim 3.
11. A tire having a tread of the composition of claim 5.
12. A tire having a tread of the composition of claim 4.
13. A tire having a tread of the composition of claim 5.
14. A tire having a tread of the composition of claim 6.
15. A tire having a tread of the composition of claim 7.

* * * * *